US008528052B2

(12) United States Patent
Lukach et al.

(10) Patent No.: US 8,528,052 B2
(45) Date of Patent: Sep. 3, 2013

(54) AUTHENTICATION, AUTHORIZATION AND ACCOUNTING SERVICES SOLUTION

(75) Inventors: Uri Lukach, Tel Aviv (IL); Doron Givony, Givaat Shmuel (IL)

(73) Assignee: Ruckus Wireless, Inc., Sunnyvale, CA (US)

( * ) Notice: Subject to any disclaimer, the term of this patent is extended or adjusted under 35 U.S.C. 154(b) by 294 days.

(21) Appl. No.: 12/679,613

(22) PCT Filed: Sep. 24, 2008

(86) PCT No.: PCT/IL2008/001279
§ 371 (c)(1),
(2), (4) Date: Aug. 16, 2010

(87) PCT Pub. No.: WO2009/040805
PCT Pub. Date: Apr. 2, 2009

(65) Prior Publication Data
US 2011/0023091 A1 Jan. 27, 2011

Related U.S. Application Data

(60) Provisional application No. 60/960,263, filed on Sep. 24, 2007.

(51) Int. Cl.
*G06F 21/00* (2006.01)
(52) U.S. Cl.
USPC .......................................................... 726/4
(58) Field of Classification Search
USPC .......................................................... 726/4
See application file for complete search history.

(56) References Cited

U.S. PATENT DOCUMENTS

| | | | | |
|---|---|---|---|---|
| 6,636,894 | B1 * | 10/2003 | Short et al. | 709/225 |
| 7,173,933 | B1 * | 2/2007 | O'Rourke et al. | 370/389 |
| 7,266,837 | B2 * | 9/2007 | Monjas-Llorente et al. | 726/2 |
| 7,451,209 | B1 * | 11/2008 | Schieber et al. | 709/224 |
| 7,549,160 | B1 * | 6/2009 | Podar et al. | 726/4 |
| 7,724,700 | B1 * | 5/2010 | Grayson et al. | 370/328 |
| 2004/0073786 | A1 * | 4/2004 | O'Neill et al. | 713/155 |
| 2004/0085942 | A1 | 5/2004 | Le et al. | |
| 2004/0192282 | A1 * | 9/2004 | Vasudevan | 455/419 |
| 2005/0063324 | A1 * | 3/2005 | O'Neill et al. | 370/310 |
| 2006/0041939 | A1 | 2/2006 | Schwartzman et al. | |
| 2007/0078986 | A1 | 4/2007 | Ethier et al. | |

OTHER PUBLICATIONS http://searchsecurity.techtarget.com/sDefinition/0..sid14_gci514491.00.html, Jun. 4, 2007.
http://www.aradial.com/aradial-radius-server-billing-pop-main.html, Oct. 20, 2010.
http://www.xs4all.nl/~evbergen/openradius/mod-radsql.html, Oct. 20, 2010.
http://www.cisco.com/eu/US/docs/net_mgmt/aceess_registrar/4.0/user/guide/obiects.html, Oct. 20, 2010.

(Continued)

*Primary Examiner* — Matthew Smithers
(74) *Attorney, Agent, or Firm* — DLA Piper LLP; Blake W. Jackson

(57) ABSTRACT

Methods, systems and modules for Authentication, Authorization and Accounting (AAA) services. In one embodiment, session information is stored in an external database so that the information can be retrieved to continue a session using a different AAA server than the one which originated the session, and/or can be retrieved by non-AAA systems.

20 Claims, 5 Drawing Sheets

(56) References Cited

OTHER PUBLICATIONS http://www.cisco.or.at/en/US/docs/net_mgmt/access_registrar/4.1/user/guide/features.pdf, Apr. 6, 2008.
http://www.cisco.com/en/US/prod/collateral/netmgtsw/ps5698/ps411/product_data_sheet0900aecd802fff64.html, Oct. 20, 2010.
http://cisco.biz/en/US/docs/net_mgmt/cns_access_registrar_identity_cache_engine/3.2/concepts/guide/repl_ref.html, Oct. 20, 2010.
http://cisco.biz/en/US/docs/net_mgmt/cns_access_registrar_identity_cache_engine/3.2/concepts/guide/car.html#wp1023272, Oct. 20, 2010.
http://www.cisco.com/en/US/docs/net_mgmt/cns_access_registrar_identity_cache_engine/3.2/concepts/guide/car.html, Aug. 11, 2008 (only available original version).

* cited by examiner

AUTHENTICATION, AUTHORIZATION AND ACCOUNTING SERVICES SOLUTION

CROSS REFERENCE TO RELATED APPLICATIONS

This application claims the benefit of U.S. Provisional Application No. 60/960,263 filed on Sep. 24, 2007 which is hereby incorporated by reference herein.

FIELD OF THE INVENTION

The current invention relates to Authentication, Authorization and Accounting (AAA) services.

BACKGROUND OF THE INVENTION

In existing broadband/mobile network, an Authentication, Authorization and Accounting ("AAA") server is used to provide a server program (such as protocol), that manages user requests in accessing computer resources and provides Authentication, Authorization and Accounting services.

The AAA server typically interacts with servers and databases for obtaining user information, such as Relational Database Management Systems (RDBMS) in which the data and the relationship between the data is stored in the data management system in tables, or such as Lightweight Directory Access Protocol (LDAP) servers, which index the data in their entries and queries for specific required data.

The interaction between the AAA server and other servers and databases is by a query language, such as LDAP or SQL which receive Remote Authentication Dial-In User Service (RADIUS) requests, process them and return responses.

User devices or applications also communicate with AAA servers, typically through RADIUS. However, other AAA protocols for interacting with the AAA servers are also in use, such as Diameter, TACACS, TACACS+, NIS and NIS+.

Authentication includes the process of identifying the user and associating a digital identity of one entity with another entity, for example associating a client with a user via a password.

Based on the Authentication, Authorization is carried out. During the authorization process, entitlements of the user are defined, such as policy or privileges.

Accounting keeps track of the consumption of network resources by users. The type of information that is gathered in accounting includes, for instance, the billing identity or, session/service hierarchy. Other information which can be gathered includes inter-alia the user's identity, and the nature and duration of the services which are being provided to the user.

SUMMARY OF THE INVENTION

According to the present invention, there is provided a system for providing Authentication, Authorization and Accounting (AAA) services, comprising: an external data repository; and a plurality of AAA servers coupled to the external data repository, wherein information on a current session which originated with one of the AAA servers is saved to the external data repository so as to allow any AAA server to continue the current session.

According to the present invention, there is also provided a method for providing Authentication, Authorization and Accounting (AAA) services, comprising: routing a user initiated request for AAA services to any one of more than one active AAA servers; the one AAA server originating a current session; and storing information on the session in an external data repository accessible to all AAA servers.

According to the present invention, there is provided a method for providing Authentication, Authorization and Accounting (AAA) services, comprising: routing a user initiated request for AAA services to an active AAA server; the active AAA server originating a current session; and storing information on the session in an external data repository which is accessible to the AAA server or to any AAA server which later replaces the AAA server as the active server.

According to the present invention, there is also provided a method of providing and receiving Authentication, Authorization and Accounting (AAA) services, comprising: a user sending an initiated request for AAA services; routing the initiated request to an active AAA server; the active AAA server originating a current session; storing information on the session in an external data repository accessible to any AAA server; the user sending an initiated subsequent request; retrieving stored information on the current session from the external data repository so that a different AAA server services the subsequent request during the same current session based on the retrieved information.

According to the present invention, there is further provided a system for providing and receiving Authentication, Authorization and Accounting (AAA) services, comprising: means for a user sending initiated requests for AAA services; means for routing the request to an active AAA server; one or more active AAA servers configured to service the user during the current session; an external database for storing information on the session accessible to any active AAA server; and means for storing and retrieving session information from the external database.

According to the present invention, there is further provided a method of a user receiving Authentication, Authorization and Accounting (AAA) services, comprising: sending an initiated request for AAA services; logging in for a session using one of at least one active AAA server, wherein information on the session is stored in an external repository accessible to any active AAA servers; and sending a subsequent initiated request which is serviced by a different AAA server during the same current session based on the stored information.

According to the present invention, there is provided a system for enabling a non-Authentication, Authorization and Accounting AAA system to access AAA session information, comprising: an external data repository configured to store session information relating to at least one AAA server; a non-AAA system; and an interface configured to allow the non-AAA system to request session information using SQL or Web Service.

According to the present invention, there is also provided a method of enabling a non-Authentication, Authorization and Accounting AAA system to access AAA session information, comprising: a non-AAA system requesting session information using; SQL or Web Service; retrieving the session information from an external data repository configured to store session information relating to at least one AAA server; the non-AAA system receiving the requested session information.

According to the present invention, there is provided a module for enabling a non-Authentication, Authorization and Accounting AAA system to access AAA session information, comprising: an interface between an external data repository storing session information relating to at least one AAA server and a non-AAA system, the interface configured to access the external data repository to retrieve the session information using SQL or Web Service.

According to the present invention, there is also provided a method of enabling a non Authentication, Authorization and Accounting AAA system to receive AAA session information comprising: using SQL or Web Service to request AAA session information from an external data repository which stores session information relating to at least one AAA server, and to pass the AAA session information to a non-AAA system.

According to the present invention there is provided a method of enabling a non-Authentication, Authorization and Accounting AAA system to access AAA session information, comprising: a non-AAA system requesting session information using SQL or Web Service; the non-AAA system receiving requested session information which was retrieved from an external data repository configured to store session information relating to at least one AAA server.

According to the present invention there is provided a module for enhancing Authentication, Authorization and Accounting (AAA) services, comprising: an interface between a AAA server and an external data repository configured to store to the external repository session information or to retrieve from the external data repository information for continuing a session.

According to the present invention there is also provided a method of enhancing Authentication, Authorization and Accounting (AAA) services, comprising: receiving information from a AAA server on a session and storing the information in an external repository; and retrieving information on a session from the external repository and providing the information to a different AAA server so that the server can continue the session.

BRIEF DESCRIPTION OF THE DRAWINGS

In order to understand the invention and to see how it may be carried out in practice, a preferred embodiment will now be described, by way of non-limiting example only, with reference to the accompanying drawing, in which.

DETAILED DESCRIPTION OF EMBODIMENTS

Figure 1:
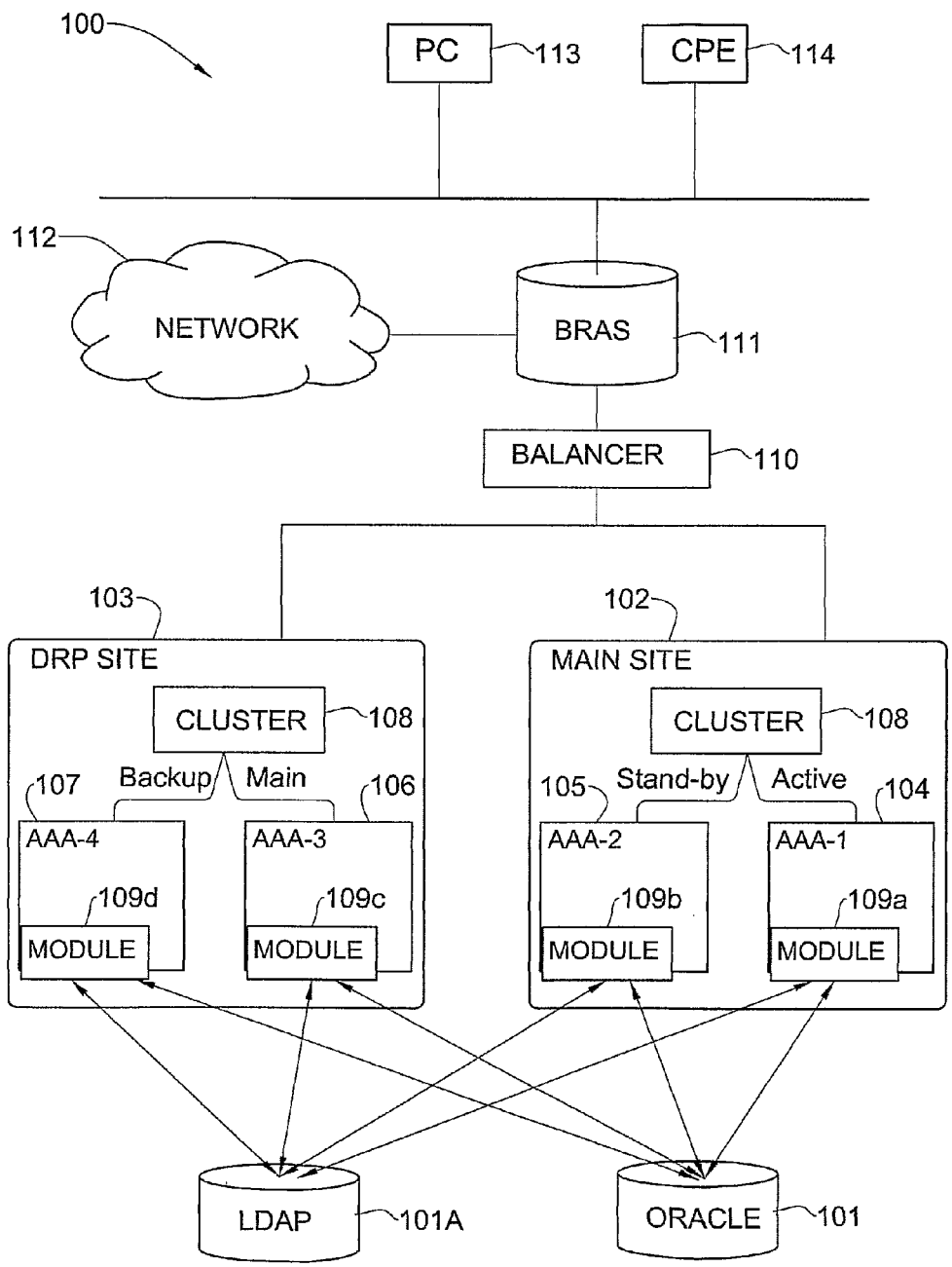
FIG. 1 is a block diagram of a system including AAA servers, according to an embodiment of the present invention.

Described herein are embodiments of the current invention for systems and methods including AAA servers.

As used herein, the phrase "for example", "such as" and variants thereof describe non-limiting embodiments of the present invention.

Reference in the specification to "one embodiment", "an embodiment", "some embodiments", "another embodiment", "other embodiments", "various embodiments", "one case", "some cases", "other cases" or variations thereof means that a particular feature, structure or characteristic described in connection with the embodiment(s) is included in at least one embodiment of the invention. Thus the appearance of the phrase "one embodiment", "an embodiment", "some embodiments", "another embodiment", "other embodiments" "various embodiments", "one case", "some cases", "other cases" or variations thereof do not necessarily refer to the same embodiment(s).

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Unless specifically stated otherwise, as apparent from the following discussions, it is appreciated that throughout the specification discussions, utilizing terms such as, "share session information", "user session information to be stored on external data repository", "session repository", "routing", "logging-in", "storing", "originated", "originating sessions", "retrieving", "servicing", "configured" or the like, refer to the action and/or processes of any combination of software, hardware and/or firmware.

In some embodiments, systems and methods including AAA servers as described herein typically, although not necessarily, provide high availability (H. A.) to users, which refers to the high availability of the user to access a system, e.g., whether to submit new request, update or alter existing data. For the sake of non-limiting example, it is assumed that a system including AAA servers may be considered highly available if users succeed in accessing a AAA server 99.5% percent of the time.

The H.A. solution relies on N+1 servers, i.e., there are N active servers and an additional server which is a stand-by server. In case one active server fails, the stand-by server becomes active, and provides services to the user.

In some embodiments, systems and methods including AAA servers as described herein allow a AAA server which has not participated in a session to determine the session status and/or continue the session, thereby providing one or more advantages including inter-alia: convenience to a user who does not need to connect to the same server throughout a session, load balancing among servers within a session, and/or continuation of a session, if the initial server fails. In some of these embodiments, the user session information remains valid even if the server which is servicing the user goes down.

Some embodiments of the invention are advantaged for maintenance of ISP servers, which have to occasionally process reloading, thus enabling the users which are connected to them to continue the same session.

In some embodiments, systems and methods including AAA servers as described herein allow access unrelated to AAA to the AAA data, using relational database querying.

Other advantages of the various embodiments of the current invention will be apparent to the reader from the description herein.

The principles and operation systems and methods including AAA servers according to the present invention may be better understood with reference to the drawings and the accompanying description.

Referring now to the drawings, FIG. 1 illustrates a system 100 including AAA servers, according to various embodiments of the present invention.

Each module shown in FIG. 1 may be made up of any combination of hardware, software and/or firmware which performs the functions as defined and explained herein.

In the embodiments illustrated in FIG. 1, the following modules appear:

Module-1 is an external data repository 101 (for example, SQL database such as Oracle), which is used to store the session information. In one embodiment, the external data repository 101 is distributed over two sites—the main site 102 and the DRP site 103, however in other embodiments, the external data repository may be concentrated at one site 102 or 103 or located at one or more other locations. Additionally or alternatively, in one embodiment, the external data repository may be located at one or more other sites. In certain embodiments of the invention, sites 102 and 103 can be connected to additional external databases 101a using, for example, LDAP.

Module-3 is at the main site 102 and includes a AAA-1 server 104 and a further server AAA-2 105. In one embodiment, each of the servers 104 and 105 includes a module 109, modules 109a and 109b, respectively. Modules 109a and 109b are configured to pass and store user session information in the external data repository 101, and/or to retrieve user session information from external data repository 101, as will be described in more detail below.

Module-2 includes a AAA server at the DRP site 103 and includes a AAA-3 server 106 and a further server AAA-4 107. In one embodiment, each of the servers 106 and 107 includes a module 109, modules 109c and 109d, respectively, configured to pass and store user session information in the external data repository 101 and/or to retrieve user session information from external data repository 101, as will be described in more detail below.

Since the information is stored in an external data repository and can be restored by any server, the AAA servers may be state-less and are not necessarily required to internally store user session information. See description below of FIG. 5 which illustrates an example of a database record in external data repository 101. It should be noted that the invention is not limited to specific modules, as shown in FIG. 1. Modules 109 can be replaced with other configurations, which, for example, expand the functionality of the server and/or the database to perform additional procedures, thus enabling to perform storing and retrieval of information, instead of the module 109.

Both sites are connected to a balancer 110 for routing users to one of the active AAA servers. In certain embodiments, the sites are connected to other means rather than the balancer, such as secondary servers on the client end. Such other means can be identifying a main site and a DRP site at the client end for sending user requests, by providing an address of the first server, and then an address of a second server.

Balancer 110 routes incoming requests to the main site, until the main site fails. Thereafter, further requests will be forwarded to the DRP site.

Both sites 102 and 103 are also connected to a router 111 through the balancer 110. In accordance with an embodiment of the invention, router 111 is a CISCO router (such as broadband remote access server (BRAS) router running Intelligent Services Gateway (ISG) or Service Selection Gateway (SSG) Module). Router 111 routes data to and from the Internet service provider's (ISP) network 112 to the sites and is capable of requesting a recovery of a session, when a server has shut down.

In some embodiments, user equipment for accessing the system includes a PC 113 with standard web browser or a point to point protocol (PPP) dialer, or customer premises equipment (CPE) 114.

A standard system 100 of AAA servers requires the setup of cluster(s) providing an Active/Stand-by configuration. That is, in addition to an active server, there is at least one other stand-by server which is not processing packets, but requires resources to setup.

In the embodiment illustrated in FIG. 1, clusters 108 are also included and may be any combination of software, hardware, and/or firmware which provides an active/stand-by configuration.

Each cluster 108 is connected to two servers. AAA-1 server 104 and AAA-2 server 105 are connected to one cluster 108, and AAA-3 server 106 and AAA-4 server 107 are connected to the second cluster 108. Cluster 108 is an active stand-by cluster, in which one of the servers is active, and the other is stand-by. The cluster manages the servers and is responsible to start the stand-by AAA server, in case the cluster has detected that the active AAA server failed.

Known systems store a shared file which is saved internally in a server site. Upon a failure, the stand-by server has to reload the data saved in the shared file to its memory in order to continue the same user session. If the entire site goes down along with the internal data file, a user will have to re-login and start a new session, as the details of his current session are lost.

On the contrary, in accordance with embodiments of the invention, since the details of the user session are stored in an external data repository, in case of a failure of a current active AAA server, the next stand-by AAA server, which receives users requests from the balancer, connects to the external data repository 101, in which the user session information is stored, and is capable of providing the required information to the user, without the need to load any user session information from a file.

Similarly, the DRP site 103 will start receiving requests if the main site 102 goes down (i.e. active server AAA-1 104 failed and then stand-by server AAA-2 105 which became the active server also failed). If the main site 102 goes down, the AAA-3 server 106 identified as 'Main' will become the "Active" AAA server and the AAA-4 server 107 identified as 'Backup' will become the "Stand-By" AAA server.

The same procedures which are taken by server AAA-2 105 when AAA-1 104 fails are now taken by AAA-3 106 in the DRP site, i.e., upon receiving user requests from the balancer, server AAA-3 106 connecting to the external data repository 101 to query on existing user session information, and upon retrieving the user session information from the external data repository 101, server AAA-3 provides services to the user, avoiding the need to start a new session.

Therefore in the system illustrated in FIG. 1, if the active server which is handling a session failed, the module corresponding to the server which has taken over, can retrieve user session information from external data repository 101. For example if server AAA-3 106 has taken over, then associated module 109c can retrieve user session information from external repository 101.

Figure 2:
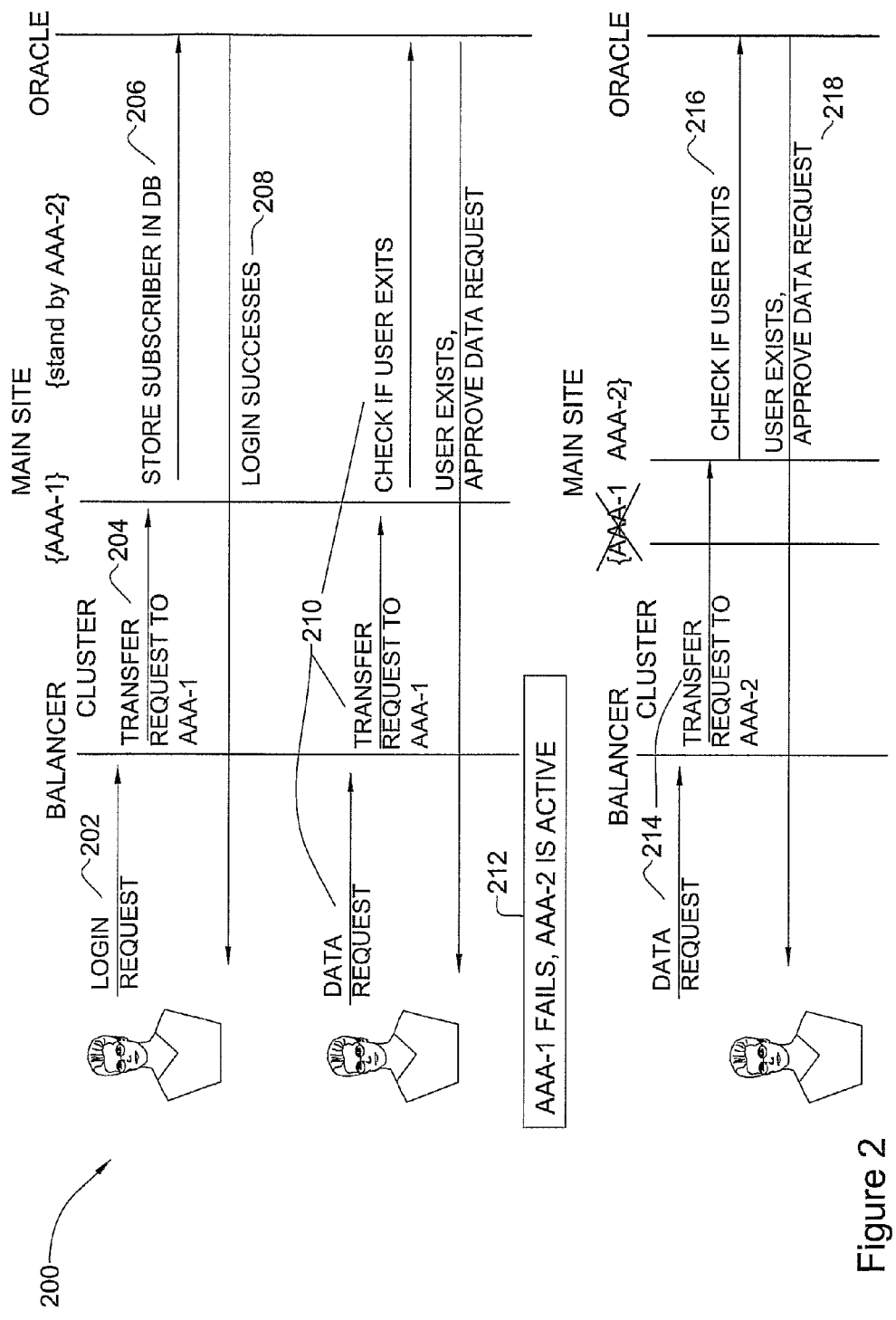
FIG. 2 is a message exchange diagram illustrating a method for using the system illustrated in FIG. 1, according to an embodiment of the present invention.

Certain methods are illustrated, in a simplified manner, by the message exchange diagrams in FIG. 2, according to various embodiments of the present invention. For example, the methods describe a user directly approaching an AAA server. In some cases there is a hardware device such as BRAS, which routes traffic to and from the digital subscriber line access multiplexers (DSLAM) on an ISP network. The BRAS receives the subscriber request, issues a RADIUS request and delivers it to the clusters in the AAA server, through the balancer.

FIG. 2 illustrates a method 200 of using the system of FIG. 1, in accordance with an embodiment of the present invention. In another embodiment, method 200 can include less stages, more stages and/or different stages than illustrated in FIG. 2.

In stage 202, the user's requests to begin a new session, for example when rebooting his computer, are received by the balancer.

In stage 204, the user logs on to an active AAA-1 server by sending a login request. The Balancer, which receives the user request, sends a RADIUS request to the AAA-1 server, corresponding to the login attempt. In stage 206, user session information is passed to an external data repository. More details on stage 206 are described with reference to FIG. 5. In stage 208, login is successful and the user is capable of receiving services from the AAA server.

If necessary, the user continues to have requests serviced by the active AAA-1 in stage 210. Upon receiving continued requests, server AAA-1 queries the external data repository for current session details, and once receiving the session details, server AAA-1 services the user's request.

In order to accommodate performance considerations, standard caching and performance techniques can be applied.

In stage 212, the active AAA-1 server goes down. Then, in stage 214, the user's request is directed by the balancer to another AAA server (AAA-2) which is now active.

In step 216, server AAA-2 queries the external data repository for session details. Upon receiving the required information, the newly active server AAA-2 in stage 218 services the user's request without requiring a new session log-in. More details on stage 216 are described with reference to FIG. 5.

In this embodiment, as long as not all AAA servers have gone down, a session may continue because any active AAA server can access information on the external repository and service user requests without requiring a new session log-in.

Figure 3:
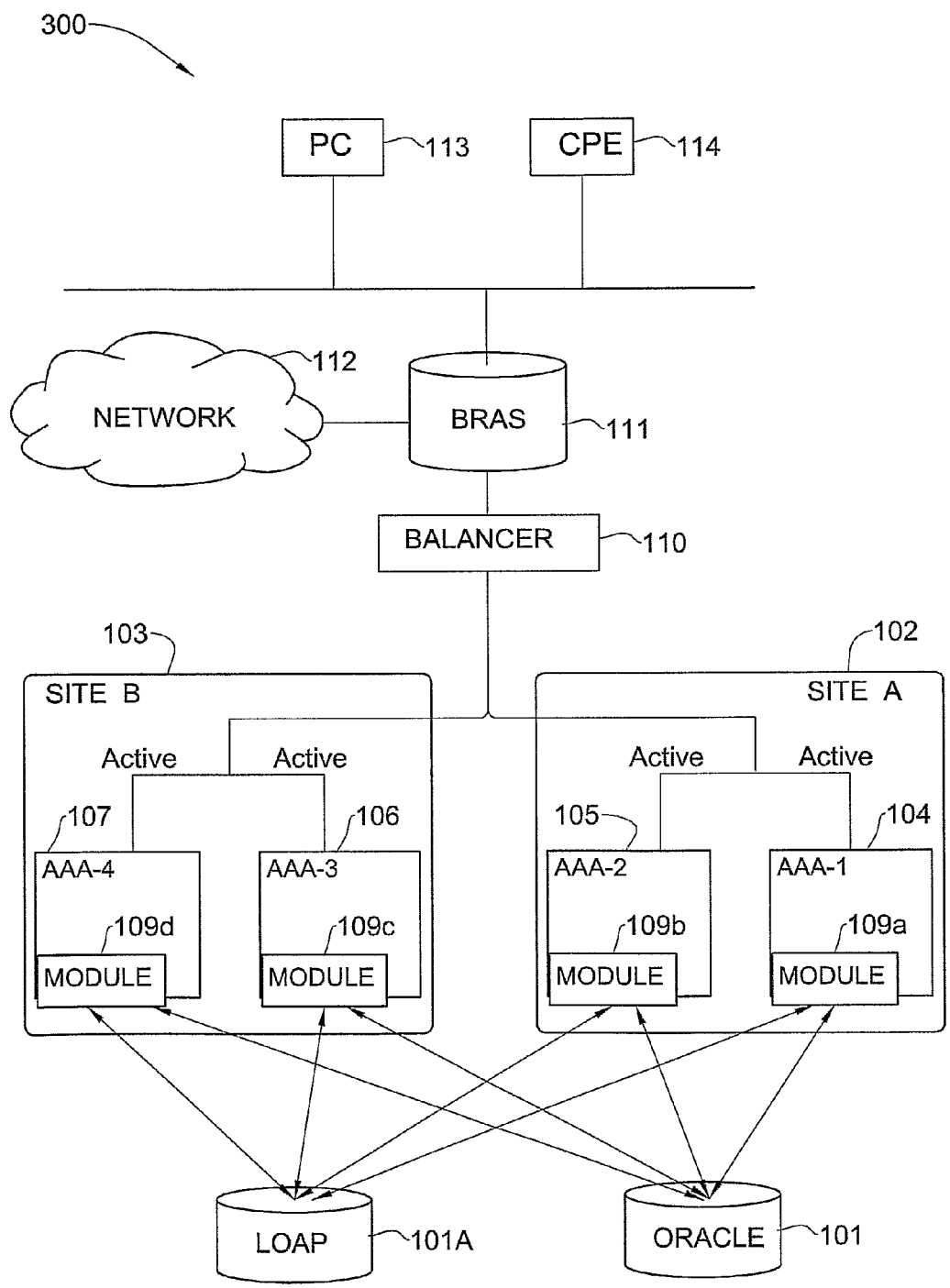
FIG. 3 is a block diagram of a system including AAA servers, according to another embodiment of the present invention.

Referring to FIG. 3, FIG. 3 illustrates a system 300 including AAA servers, according to various embodiments of the present invention.

Each module shown in FIG. 3 may be made up of any combination of hardware, software and/or firmware which performs the functions as defined and explained herein.

In the embodiments illustrated in FIG. 3, the following modules appear:

Module-1 is an external data repository 101 (for example, SQL database such as Oracle), which is used to store the session information. In one embodiment, the external data repository 101 is distributed over two sites—site A 102 and site B 103, however in other embodiments, the external data repository may be concentrated at one site 102 or 103 or located at one or more other locations. Additionally or alternatively, in one embodiment, the external data repository may be located at one or more other sites.

In certain embodiments of the invention, sites 102 and 103 can be connected to additional external databases 101a using, for example, LDAP, Module-3 is at the site A 102 and includes a AAA-1 server 104 and a further server AAA-2 105. In one embodiment, each of the servers 104 and 105 includes module 109, modules 109a and 109b, respectively. Modules 109a and 109b are configured to pass and store user session information in the external data repository 101, and/or to retrieve user session information from external data repository 101, as will be described in more detail below.

Module-2 includes a AAA server at the site B 103 and includes a AAA-3 server 106 and a further server AAA-4 107. In one embodiment, each of the servers 106 and 107 includes module 109, modules 109c and 109d, respectively, configured to pass JO and store user session information in the external data repository 101 and/or to retrieve user session information from external data repository 101, as will be described in more detail below.

Since the information is stored in an external data repository and can be restored by any server, the AAA servers may be state-less and are not necessarily required to internally store user session information. See description below of FIG. 5, which illustrates an example of a database record in external data repository 101.

It should be noted that the invention is not limited to specific modules, as shown in FIG. 3. Modules 109 can be replaced with other configurations, which, for example, expend the functionality of the server and/or the database to perform additional procedures, thus enabling to perform storing and retrieval of information.

FIG. 3 illustrates an embodiment where the active/stand-by arrangement is replaced by a balancer 110 for routing users to one of the active AAA servers, connected to servers which are all active. In certain embodiments, the active/stand-by arrangement is replaced by other means, such as secondary servers on the client end. Other means instead of the balancer can be identifying a site A and a site B at the client end for sending user requests, by providing an address of the first server, and then an address of a second server.

Balancer 110 routes incoming requests between the servers AAA-1 104, AAA-2 105, AAA-3 106 and AAA-4 107. Thus, all of these AAA servers may be active at the same time, since the servers use a central session depository, with the ability to deploy the system across area networks, such as WAN or LAN, to a DRP site that is always synchronized with the main site (functions as one system). In the embodiment illustrated in FIG. 3, either site can be considered as a main site or as a DRP site.

Both sites 102 and 103 are connected to a router 111 through the balancer 110. In accordance with an embodiment of the invention, Router 111 is a CISCO router (such as BRAS router running ISG or SSG protocols [0]Module). Router 111 routes data to and from the ISP network 112 to the sites and is capable of requesting a recovery of a session, when a server has shut down.

In some embodiments, user equipment for accessing the system includes a PC 113 with standard web browser or a point to point protocol (PPP) dialer, or customer premises equipment (CPE) 114.

As previously explained, in accordance with embodiments of the invention, since the details of the user session are stored in an external data repository, in case of a failure of a current active AAA server, the next active AAA server, which receives users requests from the balancer 110, connects to the external data repository 101, which stores the user session information, and is capable of providing the required information to the user, without the need to load any user session information from a file or start a new session.

Therefore in the system illustrated in FIG. 3, if the active server which is handling a session fails, the module corresponding to the server which has taken over can retrieve user session information from external data repository 101. For example if server AAA-3 106 has taken over, then associated module 109c can retrieve user session information from external repository 101.

In one embodiment of FIG. 3, the Balancer 110 is a "Load Balancer" which may be any combination of software, hardware and/or firmware that directs traffic. The balancing may be any appropriate criteria, including inter-alia rules and/or load balancing algorithm indicators, such as Round Robin algorithm.

Unlike current systems where a server is identified as an active server, while another is being identified as a stand-by server, saving information in an external data repository enables the load balancer 110 to distribute queries from the same session to different servers, either located in the same site or in a different site, and not necessarily route all user requests from the same session to the same server. This balancing may therefore in some cases prevent massive load on a specific server.

In some embodiments, there may be a various number of active AAA servers and/or inactive (for example backup/stand-by) AAA servers, other than illustrated in FIG. 1 or FIG. 3. In one of these embodiments, more than one AAA server, but less than all AAA servers may be active at the same time.

In one embodiment, there may be a various number of AAA servers, other than the four illustrated in FIGS. 1 and 3.

If "N" AAA servers are active, there is provided a load sharing deployment with N active servers. In one embodiment, the usage of an external data repository allows, if desired, the deployment of all the AAA servers in the network, where all the servers are active (i.e., processing packets) and are in synchronization as a single network, avoiding the need to maintain a server, which performs as a stand-by server.

Figure 4:
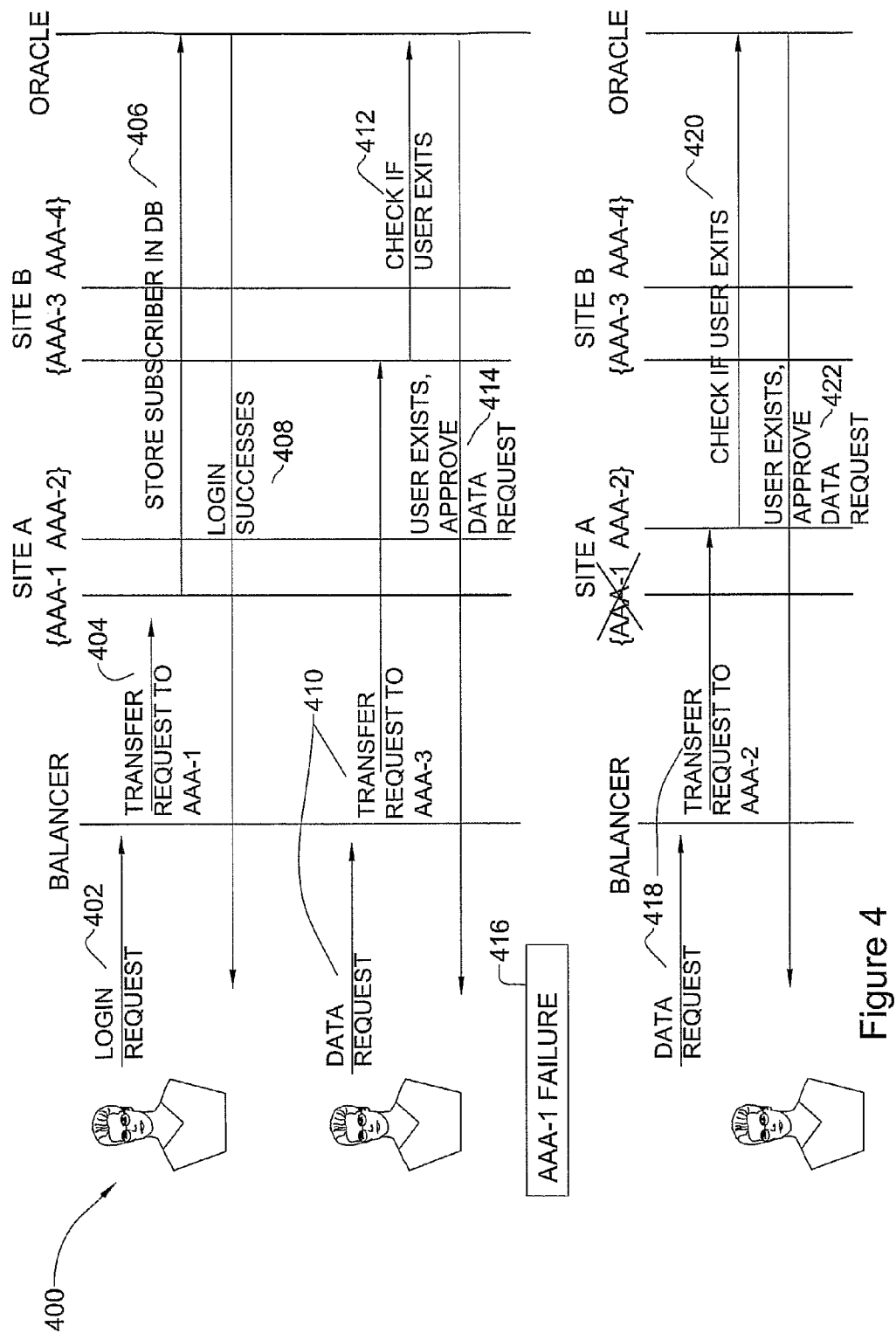
FIG. 4 is a message exchange diagram illustrating a method for using the system illustrated in FIG. 3, according to an embodiment of the present invention.

Reference is now made to FIG. 4, in which methods, according to various embodiments of the present invention are illustrated, in a simplified manner, by the message exchange diagrams. For example, the methods describe a user directly approaching an AAA server. In some cases there is a BRAS, which routes traffic to and from the DSLAM on an ISP's network. The BRAS receives the subscriber request, issues a RADIUS request and delivers it to the clusters in the AAA server, through the balancer.

FIG. 4 illustrates a method 400 of using the system of FIG. 3, in accordance with an embodiment of the present invention. In another embodiment, method 400 can include less stages, more stages and/or different stages than illustrated in FIG. 4.

In stage 402, the user's requests to begin a new session, for example when rebooting his computer, are received by the balancer.

In stage 404, the user logs on to the active AAA server, through the balancer, for example, using RADIUS protocol. In stage 406, user session information is passed to an external data repository. More details on stage 406 are described with reference to FIG. 5. In stage 408, login successes and the user is capable of receiving services from the AAA server.

If necessary, the user continues to have requests serviced by active servers. These requests can be serviced either by the same server AAA-1, or can be transferred by the balancer, as shown in the embodiment illustrated in step 410, to a different active server, such as server AAA-3. Upon receiving continued requests, either server AAA-1 or AAA-3 queries the external data repository, in step 412, for session details, and once receiving the session details, server AAA-1 or AAA-3 services the user's request without requiring a new session log-in, as illustrated in step 414.

In stage 416, the active AAA-1 server goes down. Then, in stage 418, the user's request is directed by the balancer to another AAA server (AAA-2) to provide the user with services.

Server AAA-2 in step 420 queries the external data repository for session details. Upon receiving the required information, the newly active server AAA-2 in stage 422 services the user's request without requiring a new session log-in. More details on stage 420 are described with reference to FIG. 5.

In this embodiment, as long as not all AAA servers have gone down, a session may continue because any active AAA server can access information on the external repository and service user requests without requiring a new session log-in.

Figure 5:
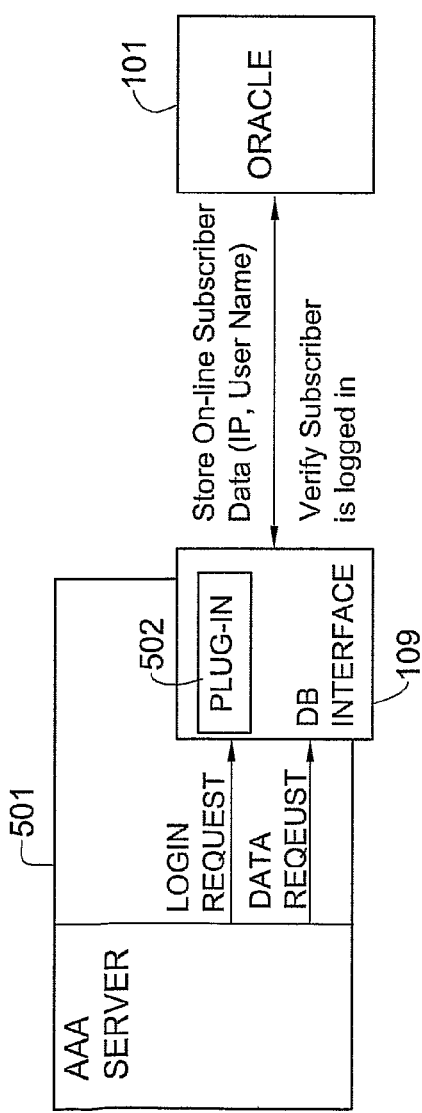
FIG. 5 illustrates an arrangement of a module for enhancing AAA services and a data record for a user AAA session in an external repository, among other modules, according to an embodiment of the present invention.

FIG. 5 illustrates in more detail AAA servers 501 enhancing modules 109 (i.e. module 109a, 109b, 109c and 109d) according to various embodiments of the present invention.

Modules 109 may be made up of any combination of software, hardware or firmware which performs the functions as defined and explained herein, for example enhancing AAA services.

In some of these embodiments illustrated in FIG. 5, module 109 is internally and/or externally coupled to a AAA server 501 and provides an interface between a AAA server 501 and an external data repository 101.

For example, the module may be configured to store to and/or retrieve from the external data repository 101 user information required by a AAA server 501 for servicing user requests during a session.

The embodiment illustrated in FIG. 5, i.e., each of modules 109, includes a plug-in 502.

In a non limiting example, a plug-in 502 may refer to a software application written in java code, which runs inside the AAA server, communicates with the AAA server 501, to receive on line-subscriber information, and extends the server functionality by communicating with the external data repository 101 in order to store and/or retrieve the on-line subscriber information. The plug-in can also provide the server with details of a specific user session.

A configuration of the plug-in 502, according to one embodiment, may be seen in FIG. 5. In the illustrated embodiment, the plug-in 502 runs inside the AAA server 501 and constantly interacts with the AAA server 501. In some cases, the plug in 502 may receive from the AAA server information regarding on-line requests of subscribers such as login and data requests, and may interact with the external data repository 101, for example in-order to:

- Validate the subscriber's credentials against the subscribers records kept in the database, at the first stage, where subscriber's credentials are being authenticated against LDAP and other databases, or at a later stage, upon receiving progressive requests from the user, such as a request for certain services.
- Fill the database with up-to-date subscriber's session information for the use of external systems, such as a Customer Relationship Management (CRM) system that displays, for example, through the call center's clerks, which subscriber is on-line at a specific moment.

FIG. 5 also illustrates a data record for a user AAA session in an external repository.

It is assumed that the router sends authentication and authorization, as well as accounting requests to the AAA server. Such queries can be at the beginning of the session and during the session's lifecycle.

The user session information stored on the external data repository 101 may vary depending on the embodiment. The user connects to the network using a password. At this stage, in addition to the user identity and the password, further parameters, which enable recovering a session, such as an IP address, are saved in the external data repository. In case of a server failure, the router, having an IP address, connects to a different server, while requesting services for a user connected to the network with a specific IP address.

The server queries, using the IP address, the external data repository for the user details. Upon receiving the user details from the server, the server sends a response to the router, including identification of the user and the services to which the user was connected.

In some embodiments, at least information which allows a AAA server to determine the status of a session and continue the session is stored in external repository 101. In one of these embodiments, at least the following user details are stored: name (identity), a network identifier such as an IP address or a Media Access Control (MAC) address, the services for which the user is assigned to and the currently active services, the user Customer Relationship Management (CRM) identifier for billing purposes.

Optionally the user details may also include additional network parameters, such as access listing.

Such user information and parameters updates can be received by the accounting records.

Information which was recorded in the external data repository can be recovered which allows a AAA server to process a user session request without requiring the beginning of a new session and the user to log-in again.

In accordance with some embodiments of the invention, the methods for using the system illustrated in FIG. 1 or 3 can provide information and other services to various companies, such as telecom companies which provide Digital Subscriber Line ("DSL") services and would likely increase the quality of service provided to their subscribers.

Assume, for example, that the current system of a telecom or other company does not allow a sharing of session information between AAA servers. Consequently, in case of a system failure (i.e. AAA server goes down) the subscribers are disconnected and have to experience the login process once again (i.e. they have to begin a new session).

Some embodiments of the invention allow a company to continue the same session for the user upon a shut down of the AAA server used for logging in, or upon switching to a different active server, for example during load balancing. In some cases, embodiments described herein also enable such a company to provide a high availability solution to subscribers.

In accordance with some embodiments of the invention, continuing with a different AAA server is possible since the systems described FIG. 1 herein use an external data repository which facilitates sharing subscriber information, while enabling the first AAA server to store subscriber information in an external data repository, and the second AAA server to retrieve the subscriber information from the external location, upon a failure of a first AAA server, or upon switching to a different active server, for example, for load balancing purposes.

In these embodiments, as long as there is at least one AAA server, which is still active or has become active, the same session may continue, as all active, as well as inactive AAA servers can access the user information on the external data repository and provide services to the user, without requiring a new session log-in.

It is noted that in the embodiment illustrated in FIG. 1 and in FIG. 3, a session record in the external data repository is accessible to a AAA server which did not initiate the session record, even if the AAA server which initiated the record has not failed. Therefore there is no need for a specific recovery process to allow a non-initiating AAA server to access the data record.

Moreover, storing user session in an external data repository, allows both activating all servers rather than identifying one or some of them as stand-by servers, which improves utilization of the given resources, and also allows load sharing between servers, while avoiding the need to load user session details to the next active server memory, from a shared file.

As far as session limitation is concerned, storing information in an external data repository enables session limitation, avoiding the need to operate a master server or operate an active-stand-by configuration.

Session limitation relates to the ability of an ISP to supervise and restrict, if necessary, users connecting to the network using the same IP address for several devices.

Conventional systems, operating an active-stand-by configuration, require operating a master server, which gathers the information on users and warn on several sessions (i.e., connection of a number of devices to the network) per client, whereas storing the information on an external data base, in accordance with the invention, inherently integrates the information and functionality of the master server, without the addition of a further server.

Figure 6:
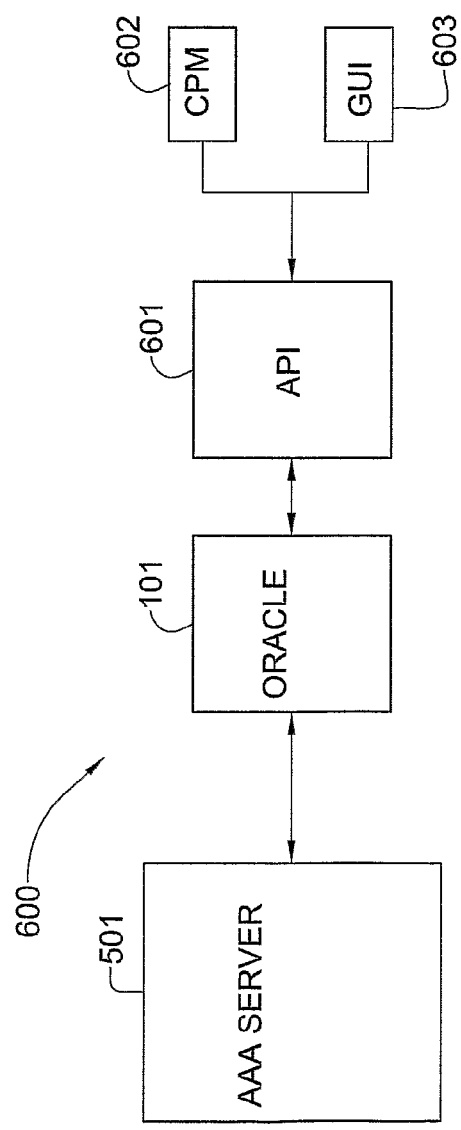
FIG. 6 is a block diagram of a system which allows access unrelated to AAA to AAA data, according to an embodiment of the present invention.

Referring now to FIG. 6, FIG. 6 is a block diagram of a system 600 which allows access unrelated to AAA, to AAA data, according to an embodiment of the present invention.

In some embodiments, storing user session related information in an external data repository 101, such as RADIUS accounting requests enables providing features, which were conventionally provided to external data systems by AAA servers operated as "in-memory-databases", in a more comprehensive and efficient way.

In accordance with one of these embodiments, various non-AAA systems, such as GUI, WAP GW, CRM can communicate with an interface connected to the external data repository 101 or directly with the external data repository 101, thus providing the systems with session related actions information required for their daily use instead of connecting to AAA servers and obtain the information stored therein, which is not a standard feature of the non-AAA systems, and further require the systems to query each active server for the information. Such daily services include, for instance, recovery of user sessions and connect or disconnect users from certain services.

Shown in FIG. 6 are two exemplary systems which are coupled to an external software component 601 that operates as an application programming interface (API) and provides a persistency layer using Database Management System (DBMS), such as Oracle: a Customer Relationship Management (CRM) 602 and a Graphical User Interface (GUI) 603 of a management application.

The CRM relates to information on processes implemented by companies, in managing their relationships with customers, including the capture, storage and analysis of a customer, a vendor or a partner, and other internal information of processes.

The GUI 603 enables accessing the user information stored in the external data repository 101.

The API 601 is also connected to an external data repository 101 and interacts with the external data repository 101 to store and query on-line subscribers' information.

For example, API 601 may contain code written in java which accelerates the application querying requests of on-line subscribers, using SQL or Web Service.

In accordance with embodiments of the invention, the CRM 602 is connected directly to the external data repository 101, or through the API 601, instead of the conventional connection to AAA server 501. This connection enables CRM 602 to access the data stored in the external data repository, while using a remote method invocation, such as RPC, CORBA or JVM, thus obtaining the information in an easier and more efficient procedure in several aspects. Firstly, CRM 603 bypasses direct usage of RADIUS requests. Moreover, since the CRM 603 receives information from the external data repository, which gathers all information on user sessions, the process of querying each of the active servers for the information, as required in a conventional process, is saved.

Therefore, API 601 provides a convenient and efficient component for obtaining data, unrelated to AAA to AAA data.

It will also be understood that some embodiments of the invention may include a suitably programmed computer. Likewise, some embodiments of the invention contemplate a computer program being readable by a computer for executing one or more methods embodiments of the invention. Some embodiments of the invention contemplate a machine-readable memory tangibly embodying a program of instructions executable by the machine for executing one or more method embodiments of the invention.

While the invention has been shown and described with respect to particular embodiments, it is not thus limited. Numerous modifications, changes and improvements within the scope of the invention will now occur to the reader. For example, in other embodiments, the system illustrated in FIG. 1 or 3 may have additional, less and/or different modules. For example, in other embodiments, the method illustrated in FIG. 2 or 4 may have additional, less, and/or different stages and/or may have more than one stage executed simultaneously.

The invention claimed is:

1. A system for providing Authentication, Authorization and Accounting (AAA) services, comprising:
   an external data repository; and
   a plurality of AAA servers coupled to said external data repository, wherein information on a current session which originated with one of said AAA servers is saved to said external data repository so as to allow any AAA server to continue said current session,
   wherein said current session information includes the following details: user name, IP address, a network identifier, services for which the user is assigned to, currently active services, the user Customer Relationship Management (CRM) identifier.

2. The system of claim 1, adapted to DRP application, wherein the server originating information on a current session and at other server among the plurality of servers are located at different sites and wherein at least one of the sites is a back up site.

3. The system of claim 1, wherein at least one of said plurality of AAA servers is active and capable of originating sessions at a given time, or service a next request in said continued current session.

4. The system of claim 1, wherein a different one of said AAA servers becomes active and continues said current session if said one is no longer active.

5. The system of claim 1, wherein said one continues said session as long as it is still active.

6. The system of claim 1 wherein the information on a session saved to said external data repository is adapted to be used for control a user's access to one or more network services among the plurality of servers located at one or more sites.

7. The system of claim 1 further comprising:
   a routing element for routing said request to an active AAA server;
   a repository configured for storing and retrieving session information from said external database;
   wherein one or more said AAA servers configured to service said user during a current session.

8. The system of claim 7, wherein said routing element for routing includes at least one selected from a group comprising: cluster, secondary server and balancer.

9. The system of claim 7, wherein said repository for storing and retrieving session information from said external database includes at least one selected from a group comprising: plug-in and a software component.

10. A system for providing Authentication, Authorization and Accounting (AAA) services, comprising:
    an external data repository; and
    a plurality of AAA servers coupled to said external data repository, wherein information on a current session which originated with one of said AAA servers is saved to said external data repository so as to allow any AAA server to continue said current session,
    wherein said external data repository is further configured to store session related actions information, the system being enabled to communicated with a non-Authentication, Authorization and Accounting AAA system; and is connected to an interface configured to allow said non-AAA system to request session related actions information saved in said external data repository using SQL or Web Service.

11. The system of claim 10, wherein said non-AAA system includes at least one selected from a group comprising: GUI, WAP, GW, CRM.

12. A method of enabling a non-Authentication, Authorization and Accounting AAA system to access AAA session information, comprising:
    a non-AAA system requesting session related actions-information using SQL or Web Service;
    said non-AAA system receiving the requested session related action information from an external data repository configured to store session information relating to at least one AAA server.

13. The method of claim 12 further comprising:
    routing a user initiated request for AAA services to at least one of a plurality of active AAA servers;
    said at least one AAA server originating a current session; and
    storing information in respect of said session in an external data repository so as to allow any AAA server to access said information and continue said current session.

14. The method of claim 13, further comprising:
    routing another user initiated request for AAA services during said current session to another of said active AAA servers; and
    retrieving information on said current session from said external data repository so that said other active AAA server can service said other request as part of said current session.

15. The method of claim 13, further comprising:
    routing a subsequent user initiated request for AAA services during said session to said one AAA server; and
    said one AAA server servicing said subsequent request as part of said current session.

16. The method of claim 13 wherein the information on a session saved to said external data repository is used for control a user's access to one or more network services among the plurality of servers located at one or more sites.

17. The method of claim 13, wherein said stored information on said session is further accessible to any AAA server which later replaces said AAA server as the active server.

18. The method of claim 17, further comprising:
- said AAA server which originated said current session becoming inactive and another AAA server becoming active instead;
- routing a subsequent user initiated request during said current session to said other AAA server; and
- retrieving information on said current session from said external data repository so that said other AAA server can service said subsequent request as part of said current session.

19. A program storage device readable by machine, tangibly embodying a program of instructions executable by the machine to perform a method of enabling a non-Authentication, Authorization and Accounting AAA system to access AAA session information, comprising:
- a non-AAA system requesting session related actions-information using SQL or Web Service;
- said non-AAA system receiving the requested session related action information from an external data repository configured to store session information relating to at least one AAA server.

20. The program storage device readable by machine, of claim 19, further comprising:
- routing a user initiated request for AAA services to at least one of a plurality of active AAA servers;
- said at least one AAA server originating a current session; and
- storing information in respect of said session in an external data repository so as to allow any AAA server to access said information and continue said current session.

* * * * *